United States Patent [19]

Bankuty et al.

[11] Patent Number: 5,823,317

[45] Date of Patent: Oct. 20, 1998

[54] APPARATUS FOR UNIFORMLY ORIENTATING ARTICLES

[75] Inventors: Geza E. Bankuty, Bradenton; Nicholas J. Perazzo, Sarasota; Steven Louis Pearson, Bradenton, all of Fla.

[73] Assignee: New England Machinery, Inc.

[21] Appl. No.: 759,521

[22] Filed: Dec. 4, 1996

[51] Int. Cl.⁶ .................... B65G 47/244; B65G 47/252
[52] U.S. Cl. .................... 198/395; 198/399; 198/379; 198/403
[58] Field of Search .................... 198/395, 399, 198/401, 379, 403

[56] References Cited

U.S. PATENT DOCUMENTS

| | | | |
|---|---|---|---|
| 3,347,349 | 10/1967 | Carlson | 198/395 |
| 3,462,823 | 8/1969 | Heisler | 29/208 |
| 3,710,955 | 1/1973 | Redman et al. | 198/379 |
| 3,722,657 | 3/1973 | Kienle et al. | 198/399 |
| 3,920,118 | 11/1975 | Krooss | 198/262 |
| 4,257,151 | 3/1981 | Coots et al. | 29/240 |
| 4,530,430 | 7/1985 | Peterlini | 198/395 |
| 4,545,476 | 10/1985 | Calvert | 198/399 |
| 4,606,387 | 8/1986 | Weislogel et al. | 198/403 |
| 4,653,628 | 3/1987 | Claypool et al. | 198/395 |
| 4,854,442 | 8/1989 | Krooss | 198/400 |
| 4,940,128 | 7/1990 | Fuller, Jr. et al. | 198/395 |
| 5,009,305 | 4/1991 | Auld et al. | 198/395 |
| 5,255,775 | 10/1993 | Buehren et al. | 198/395 |

*Primary Examiner*—William E. Terrell
*Assistant Examiner*—Patrick Mackey
*Attorney, Agent, or Firm*—Pettis & Van Royen P.A.

[57] ABSTRACT

Apparatus is disclosed for orientating articles being moved along a conveyor for processing, so that a selected feature of each article is facing in the same predetermined direction, ie. handle leading. The apparatus comprises a support member having a pair of parallel longitudinally extending drive belts attached thereto, for gripping an article therebetween for advancement of the article along the predetermined path. The apparatus further comprises structure for selectively rotating the support member to orientate the feature of the article in the predetermined direction.

7 Claims, 9 Drawing Sheets

APPARATUS FOR UNIFORMLY ORIENTATING ARTICLES

BACKGROUND OF THE INVENTION

1. Field of the Invention

The present invention relates to an apparatus that orientates articles being conveyed on a conveyer system so that a feature of each article is facing in the same predetermined direction, for example with the handle leading. The invention is particularly suitable for orientating articles being processed for filling, labeling, capping, etc. so that the articles are advanced along a predetermined path with their handle, opening, or other particular feature uniformly trailing or leading.

2. Description of the Prior Art

Industry handles many different articles that must be packaged, filled, processed or treated in some particular manner. These articles come in may different sizes and shapes that are not necessarily symmetrical, having a handle off center to one side and an opening off center to the other side, and so forth. In the packaging industry, the articles may require that a label be applied to a particular side or that a product be inserted through an opening in the article or some other requirement that necessitates the articles being orientated in a uniform manner while being processed along a production line. In some cases, it is necessary to index the opening of articles being filled with a product so that the opening is aligned with the filling spout. Each article must be orientated so that the opening of each article is in the same relationship with the indexing system as the articles advance along the conveyor system. When articles are not round, that is, when there are two shorter sides and two longer sides, the articles may be introduced to the conveyor system so that one short side or the other is leading, so it is necessary to orientate the articles so that the same short side is always leading. At other times, the articles may be laid on their side with either the bottom leading or the top leading, and again the bottles must be orientated so that either the top or the bottom is always leading so that the next apparatus in the production line may operate on the container with the same result.

Orientators are well known in the packaging industry with various methods being used to place the articles in uniform orientation. The patent to Krooss, U.S. Pat. No. 3,920,118 illustrates belts that grip a bottler's threaded top and rotates the bottle to the desired orientation. This type of mechanism frequently damages the threads that are formed into or on the bottle top causing possible cross-threading of the caps onto the bottles creating a defective product that may leak or be difficult to open.

Other devices grip the bottle body lifting the bottle and rotating it to the required orientation, for example, the patent to Peterline, U.S. Pat. No. 4,530,430. Mechanical arms that grip articles to be rotated frequently scratch the exterior surfaces of the articles, which becomes readily apparent on articles that are clear. Also, the mechanical arms often damage the labels on articles that have been pre-labeled.

To avoid damage to the exterior threads or exterior surfaces of the article, some orientating equipment uses a pair of hooks that enter the neck of the article. These hooks frequently introduce foreign matter into a generally sterile or clean environment causing contamination of the contents, that may include food products. Such hooks also may damage the seal ring on the top edge portion of the article. Undamaged, this seal ring sealingly engages the cap seal to prevent leakage of product from the article or entrance of air into the article. Damage to the seal ring creates a high risk of contaminating the product, leakage and/or other defects.

The use of mechanical arms and mechanical grippers that strike the bottles during the gripping and rotating motion create a drumming noise. This drumming noise frequently reaches objectionable sound levels in an already noisy environment, so that ear protection is required in the operating plant adding cost and discomfort.

The orientators currently in use frequently damage the articles as they are being processed causing further difficulties during the capping process or creating lower quality products.

SUMMARY OF THE INVENTION

In order to overcome the disadvantages of the prior art, it is an object of the present invention to provide an apparatus that orients the articles with reduced risk of damage to them, and which operates in a substantially continuous manner. It is a further object of this invention to provide an apparatus that is capable of handling various sized articles with only minor adjustment being required.

The current apparatus for orientating articles comprises a support frame and at least one conveyor that is positioned adjacent to the support frame for advancing an article along a predetermined path. The direction of movement along the predetermined path is defined as a downstream direction and the opposing direction along the predetermined path is defined as the upstream direction. A selectively rotatable support member is connected to the frame and disposed adjacent to the predetermined path along the conveyor. A means for rotating the support member is attached to the support frame and connected to the support member for rotation of the support member between two positions.

A sensor for detecting orientation of an article as the article is conveyed along the predetermined path is attached to the frame adjacent the predetermined path proximal the support member. The sensor is operatively connected to the means for rotating the support member for selective rotation of the support member.

A pair of continuous loop drive belts are each mounted upon separate pairs of rotary drive members that are each connected to the support member. A means for driving at least one of the rotary drive members is attached to the frame and is connected to that rotary drive member for movement of the drive belt mounted thereon about a closed path. The pair of drive belts are aligned longitudinally to one another and are generally parallel to the conveyor. The belts are spaced apart from one another for engagement of an article therebetween for transporting the article primarily in the downstream direction along the predetermined path.

BRIEF DESCRIPTION OF THE DRAWINGS

For a full understanding of the nature and objects of the invention, reference should be had to the following detailed description taken in connection with the accompanying drawings, in which.

Similar reference characters refer to similar parts throughout the several views of the drawings.

DESCRIPTION OF A PREFERRED EMBODIMENT

Figure 1:
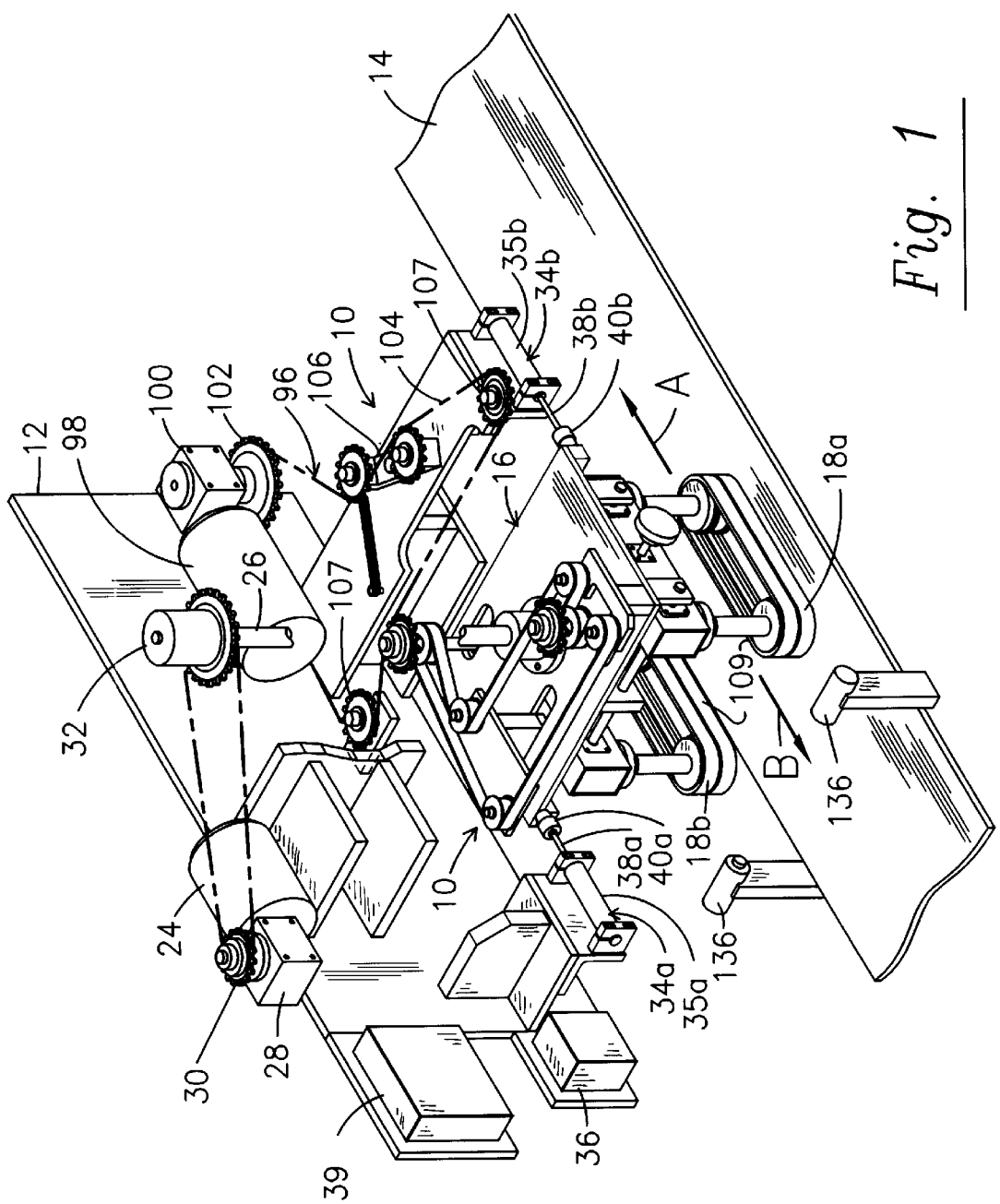
FIG. 1 is a perspective view of one embodiment of the apparatus of this invention.

Two suitable embodiments of the apparatus of this invention are illustrated in FIGS. 1–9, because of the general similarity of certain portions of each of these embodiments with the corresponding portions of the other embodiments, the embodiment of FIGS. 1–8 will be described in detail below, and the second embodiment of the apparatus will be described with reference to its drawing illustrating the principal differences between the two alternative embodiments. The first embodiment of the apparatus of the invention is generally indicated as 10 in the views of FIGS. 1, and 3–7, while the second embodiment of the apparatus, is generally indicated as 210 in FIG. 9. The second embodiment will utilize reference numerals increased by an increment of 200 for the same parts.

Figure 3:
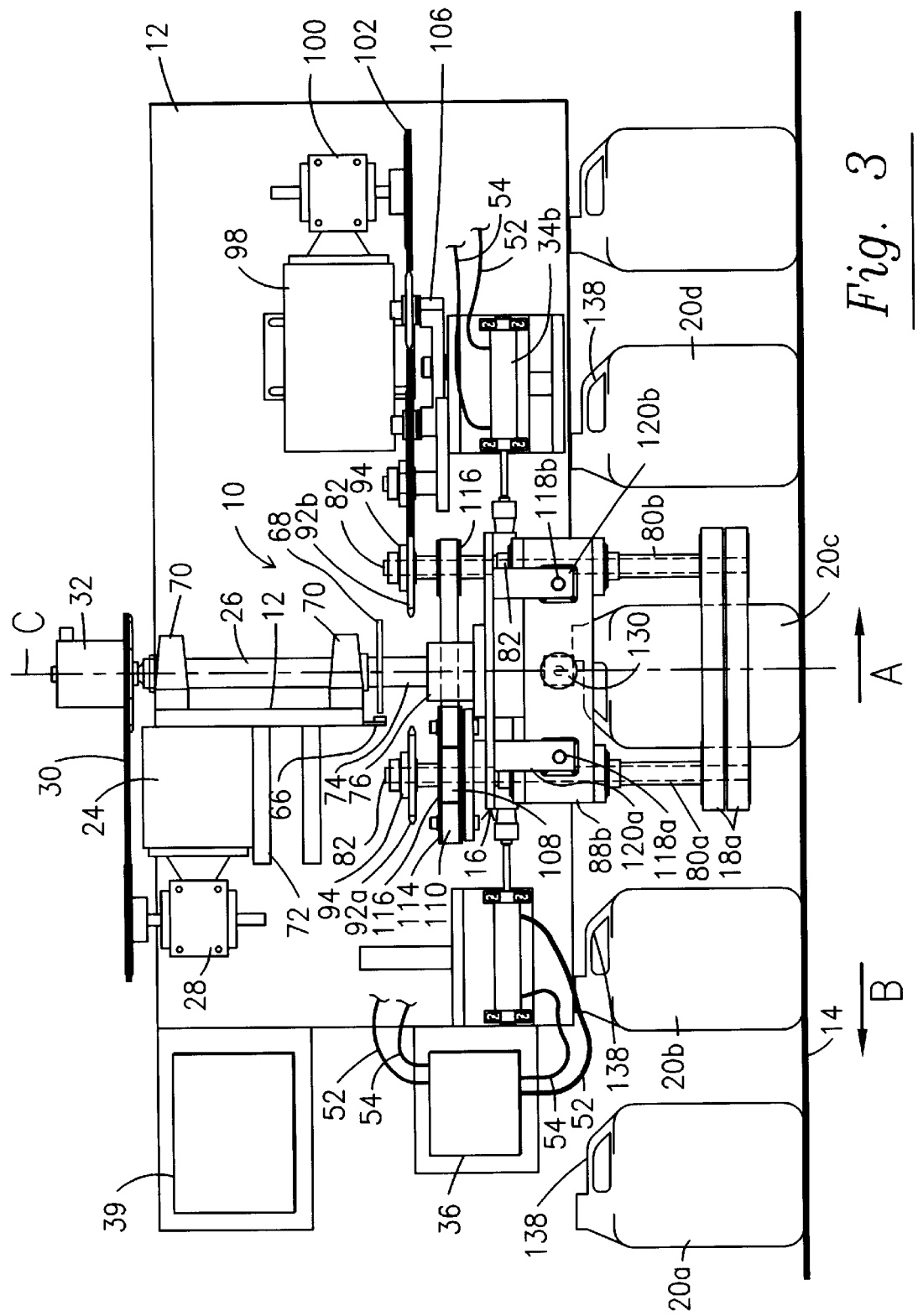
FIG. 3 is a front elevational view of the apparatus of FIG. 1 illustrating the movement of articles through the apparatus.

In FIG. 1, it can be seen that the apparatus for orientating articles 10 comprises a support frame 12, at least one conveyor 14, a support member shown generally as 16 and a pair of drive belts 18a and 18b. The support frame 12 may stand freely on the production floor by being attached to additional framing and legs which are not shown. In other embodiments, the support frame 12 may be tied directly into other support elements supporting other apparatus that comprises part of the production line. The conveyor 14, in this embodiment, may be any standard well known conveyor that is suitable for the purpose intended and which may be a part or extension of a production line conveyor system. As seen in FIG. 3, the conveyor 14 is positioned adjacent to the support frame 12 and is used for advancing articles 20a–20d along a predetermined path whose direction may be defined by the arrows shown in FIGS. 1 and 3, the arrow A defining the downstream direction and the arrow B defining the upstream direction.

Figure 4:
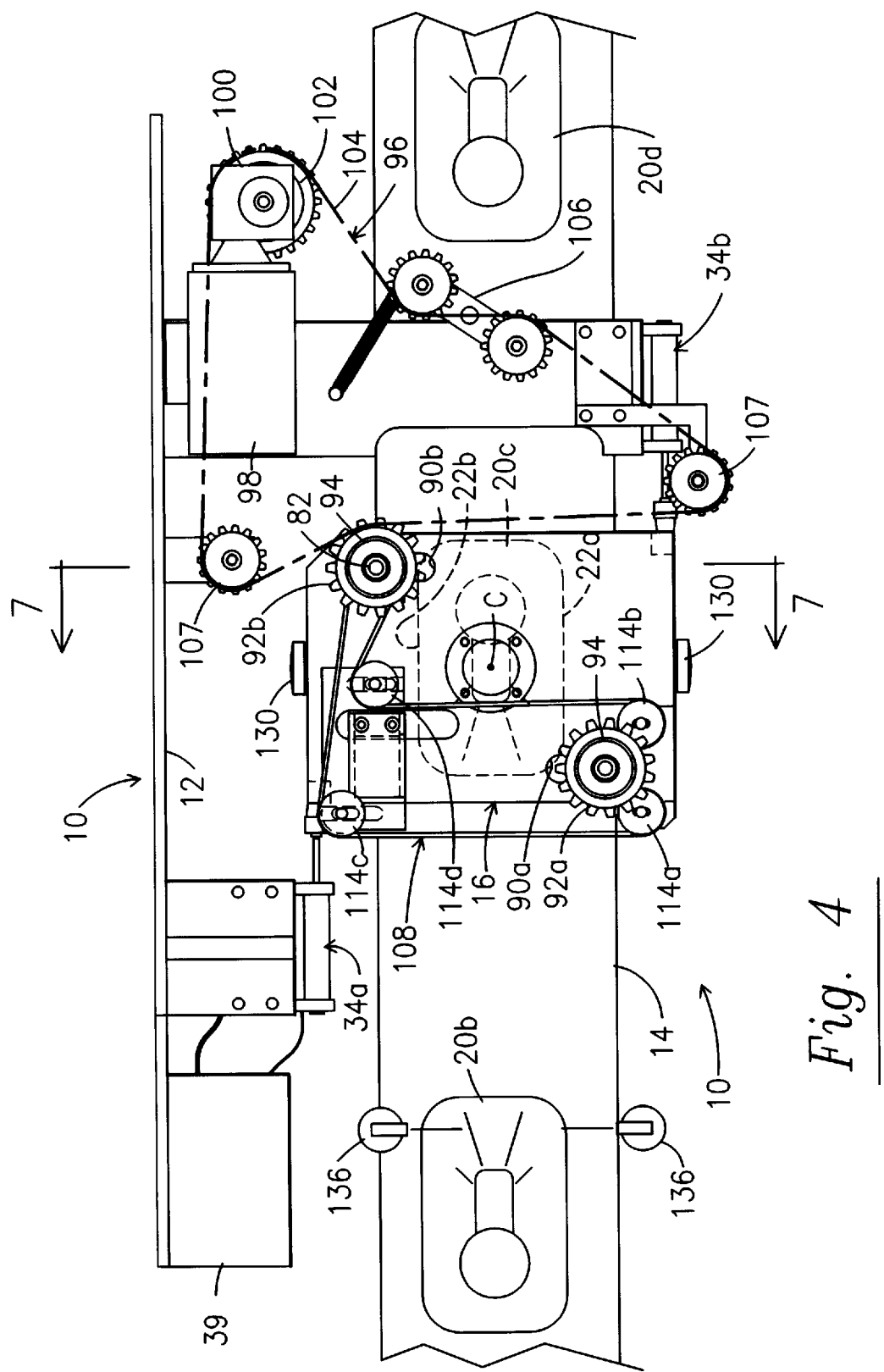
FIG. 4 is an enlarged top plan view of the apparatus of FIG. 3.

The support member 16 is disposed adjacent to the predetermined path along the conveyor 14 so that articles traveling along the predetermined path on the conveyor 14 in the upstream direction A will pass between and be engaged by the pair of drive belts 18a and 18b. As seen in FIG. 4, the drive belts 18a and 18b are spaced apart just enough so that they engage opposing sides 22a and 22b of the article 20c. The support member 16 is selectively rotatable about its axis of rotation C, which is generally normal to the conveyor 14 and normal to a plane passing through the drive belts 18a and 18b. The axis C, as shown in FIG. 3 and 4 passes through the center point of a rectangle formed on a plane through the drive belts 18a and 18b, with the drive belts 18a and 18b forming opposing longitudinal sides of that rectangle. A means for rotating the support member 16 comprises a drive motor 24 that is mounted to the support frame 12, and is operably connected to the support member 16 for rotation thereof. In this embodiment, the drive motor 24 is connected to the drive shaft 26 through a gear box 28, a sprocket and chain drive 30 and a clutch 32 all of which comprise equipment well known in the art. For example in a preferred embodiment, the drive motor 24 is a one-half horsepower DC motor and the clutch 32 is a pneumatic friction clutch that permits slippage for transfer of selectively variable torque. The clutch 32 may be a Horton clutch, model number 800100 or the equivalent. The shaft 26 is attached to the support member 16 so that the drive shaft's axis coincides with the axis C of the support member 16. The drive motor 24 operates continuously in the same direction so that the support member 16, when viewed in the top plan view, as in FIG. 5, rotates in the counter clockwise direction. The rotation of support member 16 is controlled by at least one stop device that engages the support member 16 in opposition to its rotation. In the embodiment illustrated, there are two stop devices 34a and 34b that are each comprised of standard two-way pneumatic cylinders 35a and 35b that are connected to an air source, conveniently a compressor 37. As seen in schematic form in FIG. 8, the pneumatic cylinders 35a and 35b are comprised of a piston with shaft 38a and 38b and a bumper 40a and 40b. By engaging the support member 16, the stop devices 34a and 34b prevent continued rotation of the support member 12 in the counter clockwise direction (when viewed in the top plan view) to ensure that the support member 16 with its attached drive belts 18a and 18b are aligned generally parallel with the predetermined path and the conveyor 14. As shown in the schematic drawing of FIG. 8, the control system for operating the rotation of the support member 16 comprises a pneumatic system 36 and a conveniently programmable controller 39. The pneumatic system 36 shown in FIG. 8 comprises two parts, the first part 42 for control of the stop devices 34a and 34b, and the second part 44 for controlling the clutch 32 that controls rotation of the support member 16. Both parts 42 and 44 of the pneumatic system 36 are connected to a compressor 37 that provides air at a pressure of approximately 60 psi.

The first part 42 of the pneumatic system comprises an air supply pipe 46 that is connected at one end to the air compressor 37 and at the other end to a first solenoid valve 48 that selectively switches the air flow between airline 50 and airline 52. Inserted in the first air supply pipe 46, intermediate the compressor 36 and the first solenoid valve 48, is a first air pressure regulator 54 that reduces the air pressure within the first part 42 from 60 psi as provided by the compressor 37 to within a pressure range of 25 to 35 psi. When first solenoid valve 48 causes the air pressure to flow through line 52, the air forces the piston and shafts 38a and 38b outwardly from the respective two-way pneumatic cylinders 35a and 35b so that the bumpers 40a and 40b engage opposing corners of the support member 16 preventing the support member 16 from rotating further. The bumpers 40a and 40b are comprised of rubber for cushioning purposes and may be comprised of other material suitable for the purpose. When it is desired that the support member 16 be rotated, the first solenoid valve 48 directs the flow of air to air line 50 which causes the piston and shaft 38a and 38b to retract inwardly into their respective two-way pneumatic cylinders 35a and 35b. Once the stop devices 34a and 34b have been retracted, the support member 16 is free to rotate.

The second part 44 of the pneumatic system 36 controls the operation of the clutch 32 for rotation of the drive shaft 26 and the attached support member 16. The second air supply pipe 56 is split into two air lines, air line 58 and air line 60. Air line 58 will provide air pressure at approximately 60 psi, while air line 60 has a second air pressure regulator 62 inserted therein that reduces the pressure in that line to within the range of 15 to 25 psi. Air line 58 and air line 60 are connected to a second solenoid valve 64 that selectively provides air to the clutch 32 at a pressure of 60 psi to provide a first torque force or within the range of 15 to 25 psi to provide a second torque force. Since the drive motor 24 continuously operates, the pneumatic slip clutch 32 is used to provide the appropriate rotational force to hold the support member 16 firmly against the stops or the rotational force necessary to rotate the support member 16 rapidly through 180 degrees. The higher the pneumatic pressure, the higher proportion of the torque of the drive motor 24 is supplied to the drive shaft 26.

Figure 8:
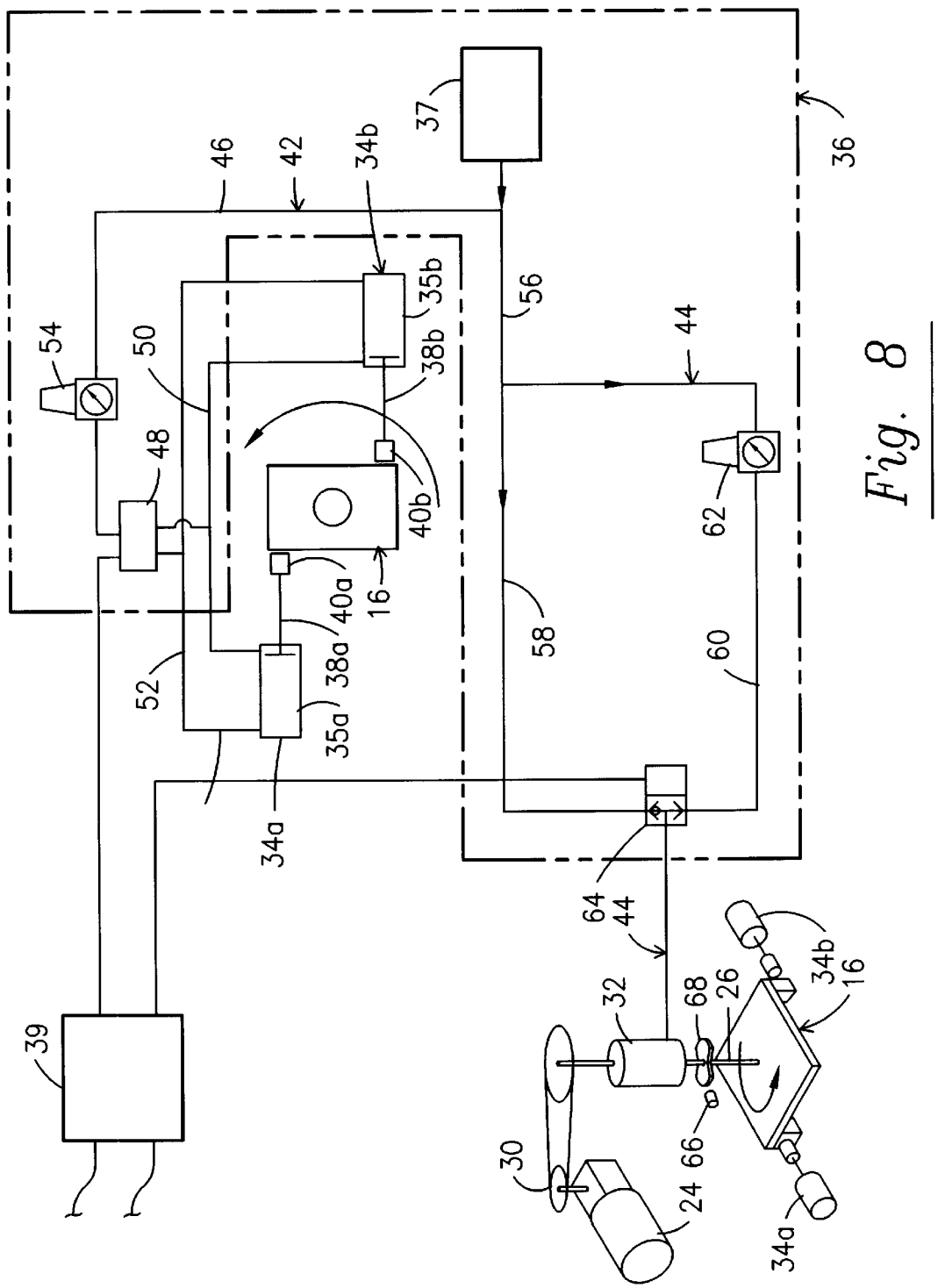
FIG. 8 is a schematic drawing of the control systems that control the rotation of the support member.

The rotation of the support member 16 is further controlled by a proximity sensor 66 and a flag 68, shown most clearly in FIG. 8. The proximity sensor 66 senses the presence or non-presence of the flag 68 and signals the programmable computer 35 upon the changed condition. The flag 68 is comprised of two 90 degree wedges of a circular disc that is attached to the drive shaft 26 and rotates therewith. The wedges of the flag 68 are aligned so that when the support member 16 rotates approximately 90 degrees, the proximity sensor 66 senses the leading edge of one of the wedges of the flag 68 and signals the programmable computer 35 which directs the second solenoid 64 of second part 44 of the pneumatic control system 36 to switch between the air line 58 and the air line 60, changing the torque being applied to the drive shaft 26.

When the pneumatic cylinders 35a and 35b withdraw the bumpers 40a and 40b, the low pressure air provides sufficient rotational force through the clutch 32 and the shaft 26 so that the flag 68 clears the proximity sensor 66. When the flag 68 clears the proximity sensor 66, the programmable controller 39 switches the second solenoid valve 64 transferring the supply of air from the air line 60 to air line 58, the high pressure (60 psi) line. The high pressure air increases the torque supplied by the clutch 32, creating the first torque force to the drive shaft 26 so that the support member 16 is rotated rapidly through 90 degrees. At approximately 90 degrees of rotation, the proximity sensor 66 again senses the presence of the flag 68. The programmable controller 39 switches the second solenoid 64 transferring the supply of air from air line 58 to the low pressure air line 60 so that the support member's momentum carries it the remaining 90 degrees to complete the 180 degree rotation. The support member 16 coasts the remaining 90 degrees to keep the support member 16 from striking the stop devices 34a and 34b at high speed. The lower pressure air provided to the clutch 32 reduces the torque applied, creating the second torque force, to the shaft 26 by the first drive motor 24 so that the stop devices 34a and 34b can hold the support member in position where the drive belts 18a and 18b are aligned with the predetermined path.

As shown in FIG. 3, the drive shaft 26 is mounted to the support frame 12 by brackets 70 and the drive motor is attached to the support frame 12 by the support member 72. The drive shaft 26 is rotatably mounted to the brackets 70 utilizing bearings and other structure well known in the art for supporting rotating shafts. The first end 74 of shaft 26 is attached to a hub 76 that is attached to the support member 16. The second end 78 of shaft 26 is operatively connected to the pneumatic friction clutch 32.

The orientating apparatus 10 further comprises four spindles, a first spindle 80a, a second spindle 80b a third spindle 80c and a fourth spindle 80d, that each have a first end 82 and a second end 84. Each of the spindles, 80a through 80d, are journaled for rotation to the support member 16. Four rotary drive members, conveniently pulleys 86a, 86b, 86c, and 86d, are connected to the support member 16 by being mounted on a respective spindle 80a, 80b, 80c and 80d. The pulleys 86a and 86b are mounted on a respective one of the first and second spindles 80a and 80b of the four spindles, and the pulleys 86a and 86b operatively engage one of the pair of drive belts 18a and 18b, conveniently drive belt 18a. The pulleys 86c and 86d are mounted on a respective one of the third and fourth spindles 80c and 80d, and the pulleys 86c and 86d operatively engage the other one, 18b, of the pair of drive belts 18a and 18b. In the embodiment disclosed in the drawing FIGS. 1 through 8, drive belts 18a and 18b each comprise two separate drive belts that are mounted upon their respective pulleys that are sized and configured to receive a pair of belts thereon. The drive belts 18a and 18b move, as viewed in a plan view, about the pulleys in a closed path in a clockwise or counterclockwise direction as dictated by the direction of rotation of the spindle being driven. The drive belts 18a and 18b are comprised of rubber with a nylon woven material applied to the exterior surface that contacts the article, creating a felt like outwardly facing surface. The felt like surface reduces the amount of damage to the exterior surface of the article. In other embodiments the drive belts 18a and 18b may be comprised of polyeurethane, neoprene or any other material suitable for this purpose.

Figure 2:
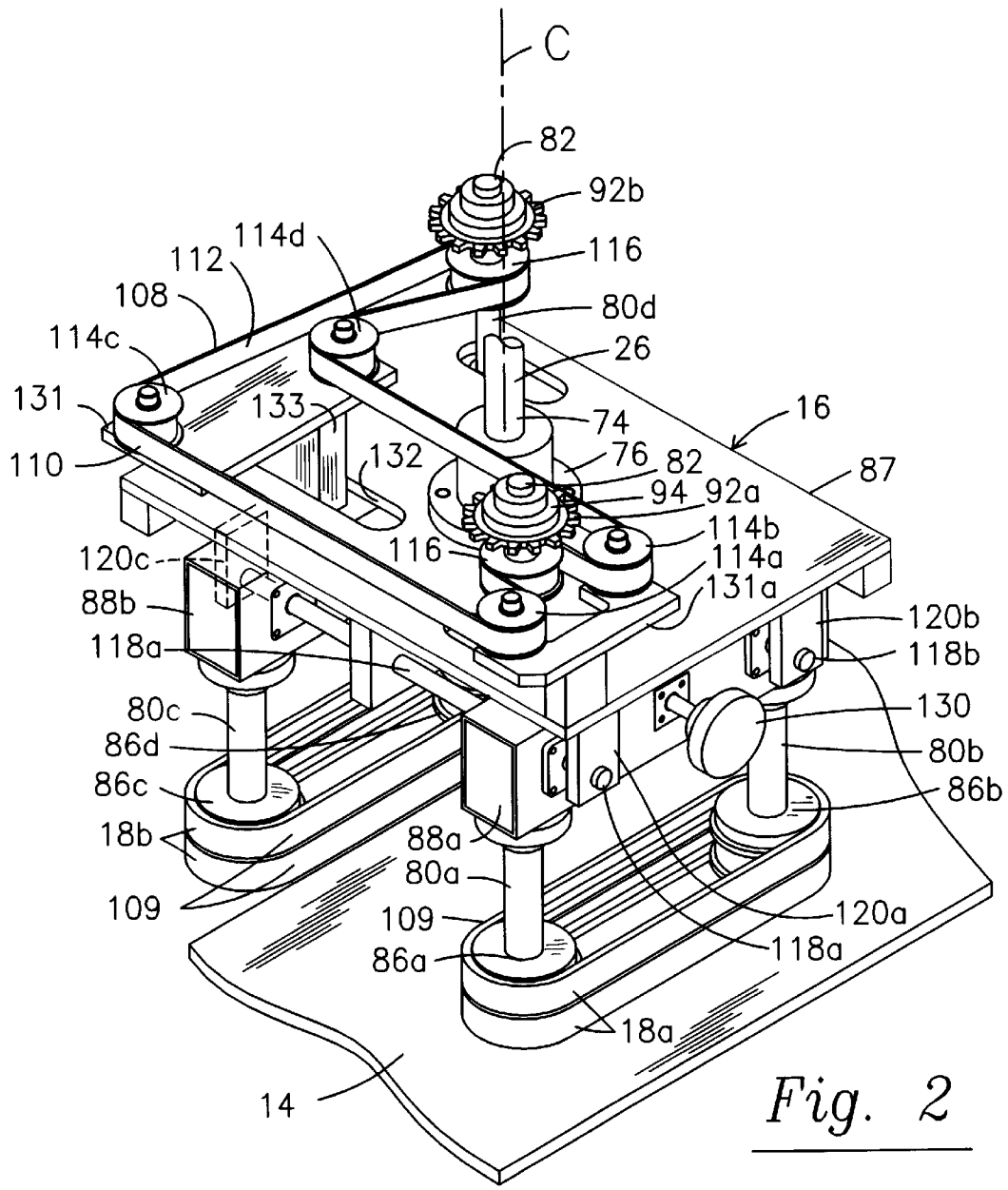
FIG. 2 is an enlarged view of a portion of the perspective view of FIG. 1 for purpose of clarity.

As seen most clearly in FIG. 2, the support member 16 further comprises a base 87 and a first longitudinally extending support block 88a and a second longitudinally extending support block 88b that are connected to the base 87. Spindles 80a and 80b are mounted to support block 88a and spindles 80c and 80d are mounted to support block 88b. Spindle 80a and spindle 80d are mounted to their respective support blocks 88a and 88b by standard bearings and extend upwardly through their respective blocks 88a and 88b and through slots 90a and 90b, respectively, formed in the base 87 of the support member 16. A chain drive sprocket 92a is attached to the first end 82 of the spindle 80a and a chain drive sprocket 92b is attached to the first end 82 of spindle 80d. A one way roller clutch 94, which may be a Torrington model No. RC121610-FS or the like, is inserted within the chain drive sprockets 92a and 92b. As shown in FIG. 1, sprocket 92b engages the chain drive shown generally as 96 for rotation of the sprocket 92b and thus also rotates the spindle 80d and the drive belts 18b.

A second drive motor 98, that may also be a DC ½ horsepower motor of a type that is well known, is attached to the support frame 12 and drives the chain drive 96 by a gear box 100 and a sprocket 102. The chain drive 96 comprises a chain 104, two chain drive sprockets 107, that are attached to the support frame 12, and a spring loaded "S" shaped multi-idler 108. The chain 104 passes about the sprocket 102 and the chain drive sprockets 107 to form a loop and the "S" shaped multi-idler 108 takes up the slack in the chain 104 to keep the chain 104 tightly wrapped about the various sprockets. When the support member 16 is rotated, sprocket 92b disengages from the chain 104 and the sprocket 92a engages the chain 104. When the speed of rotation of the support member 16 exceeds the speed of the chain 104 it causes the sprocket 92b to move in the reverse or clockwise direction temporarily. As this would be detrimental to operation of the apparatus 10, the one way roller clutch 94 permits the sprocket 92a to idle until the speed of the chain 104 exceeds the speed of rotation of support member 16. When either sprocket 92a or 92b is engaged by the chain drive 96 the spindle 80a or 80d respectively will rotate in the counterclockwise direction causing the associated drive belt 18a or 18b to also rotate in the counterclockwise direction. This direction of rotation causes the interior portion 109 of the drive belts 18a and 18b to move articles 20 in the downstream direction A. Drive belts 18a and 18b are operated at a speed approximately 3 times faster than the conveyor 14 is advancing. This ratio of 3 to 1 permits the articles 20 to maintain the proper spacing on the conveyor 14.

As only one drive sprocket 92a or 92b is engaged at any one time with the chain 104, only the related drive belt 18a or 18b will be moved. It is possible that the apparatus 10 may operate with a single drive belt 18a or 18b being driven; however, apparatus 10 operates with better results if both drive belts 18a and 18b are being positively driven. A continuous loop timing belt 108, comprised of polyeurethane or any other material suitable for the purpose, has a first side 110 and a second side 112. The timing belt 108 connects the first spindle 80a with the second spindle 80d for simultaneous rotation so that both drive belts 18a and 18b are positively rotated. The timing belt 108 is passed about a series of idlers 114 (114a, 114b, 114c, and 114d) so that the first side 110 of the timing belt 108 engages spindle 80a and the second side 112 engages spindle 80d. To prevent slipping and to provide better transfer of power from the spindles to the timing belt 108, drive wheels 116 are attached to the spindles for engagement with the timing belt 108. The arrangement of the idlers 114a–114d, permits the timing belt 108 to wrap about the drive wheels 116 so that the spindles 80a and 80d rotate in opposite directions and therefore the drive belts 18a and 18b will also move in opposite directions. For example, as seen in FIG. 1, spindle 80d is now engaged with the chain drive and is rotated in the counterclockwise direction moving the drive belts 18b in a counterclockwise direction about the pulleys 86c and 86d. This causes the interior portion 109 of the belt 18b to move in the downstream direction A so that the articles will be advanced in the direction A. The timing belt 108 causes the spindle 80a to rotate in the clockwise direction causing the drive belt 18a to move about the pulleys 86a and 86b in the clockwise direction. In this way the interior portion 109 of the drive belts 18a are moving in the direction A of the conveyor and assist drive belts 18b in advancing the articles along direction A.

Figure 7:
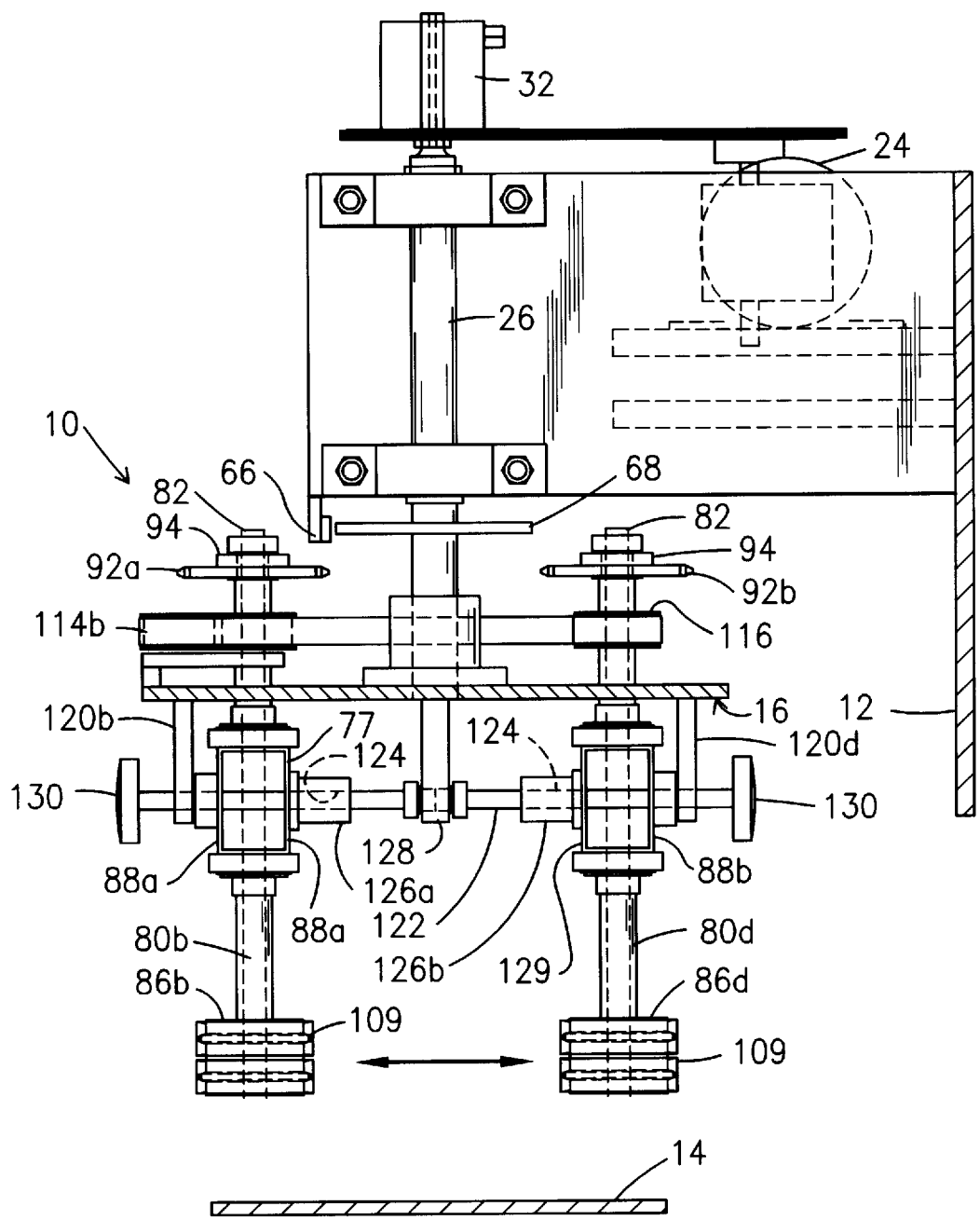
FIG. 7 is a right side elevational view of the invention of FIG. 1.

In the embodiment disclosed in FIGS. 1–6 the drive belt 18a and 18b may be adjusted laterally to the conveyor 14 in order to receive larger or smaller articles 20 therebetween. The support member 16 further comprises a first rod 118a that is mounted to the base 87 of the support member 16 by a pair of brackets 120a and 120c and a second rod 118b is also attached to the support member 16 by a pair of brackets 120b and 120d. Support blocks 88a and 88b are slidably mounted to the first support rod 118a and the second support rod 118b for movement of the support blocks toward and away from one another. An adjustment rod 122, as shown in FIG. 7, extends through apertures (not shown) in each support block 88a and 88b. The adjustment rod 122 is threadably received by a threaded bore 124 formed in a mounting block 126a that is attached to the interior side 127 of the support block 88a and is threadably received by the threaded bore 124 formed in a mounting block 126b that is attached to the interior side 129 of the support block 88b. The adjustment rod 122 extends through and is journaled to a support bracket 128 for rotation therein; however, longitudinal movement of the adjustment rod 122, with respect to the support bracket 128, is not permitted. The threads in the mounting blocks 126a and 126b are oppositely threaded so that rotation of the adjustment rod 122 causes the support blocks 88a and 88b to move toward one another or away from one another. For ease of use the adjustment rod 122 may have knobs 130 on opposing ends.

The in and out movement of the support blocks 88a and 88b would require lengthening or shortening of the timing belt 108 if some of the idlers 114 were not moveable and others fixed. As can be best seen in FIG. 2 along with FIG. 1, idlers 114a and 114b are mounted to a platform 131a and spaced apart from and fixed to the base 87 of the support member 16 while idlers 114c and 114d are attached to a platform 131 that is also spaced apart from the base 87. A leg 133 is attached to the platform 131 and extends through the access slot 132 and is attached to the support block 88b that as the support block 88b moves inwardly and outwardly so do the idlers 114c and 114d. As spindles 80a and 80d extend through their respective support blocks 88a and 88b and are attached thereto they must also extend through the respective slots 90a and 90b in the base 87. Therefore, as the support blocks 88a and 88b move toward one another, spindles 80a and 80d and idlers 114c and 114d move inwardly with their respective support blocks 88a and 88b. Idlers 114a and 114b remain stationary taking up the slack created by the inward movement of the other idlers and the spindles. With this configuration, there is no need to replace the timing belt 108 or adjust the idler positions to compensate for the changing spacing between the support blocks 88a and 88b.

Figure 9:
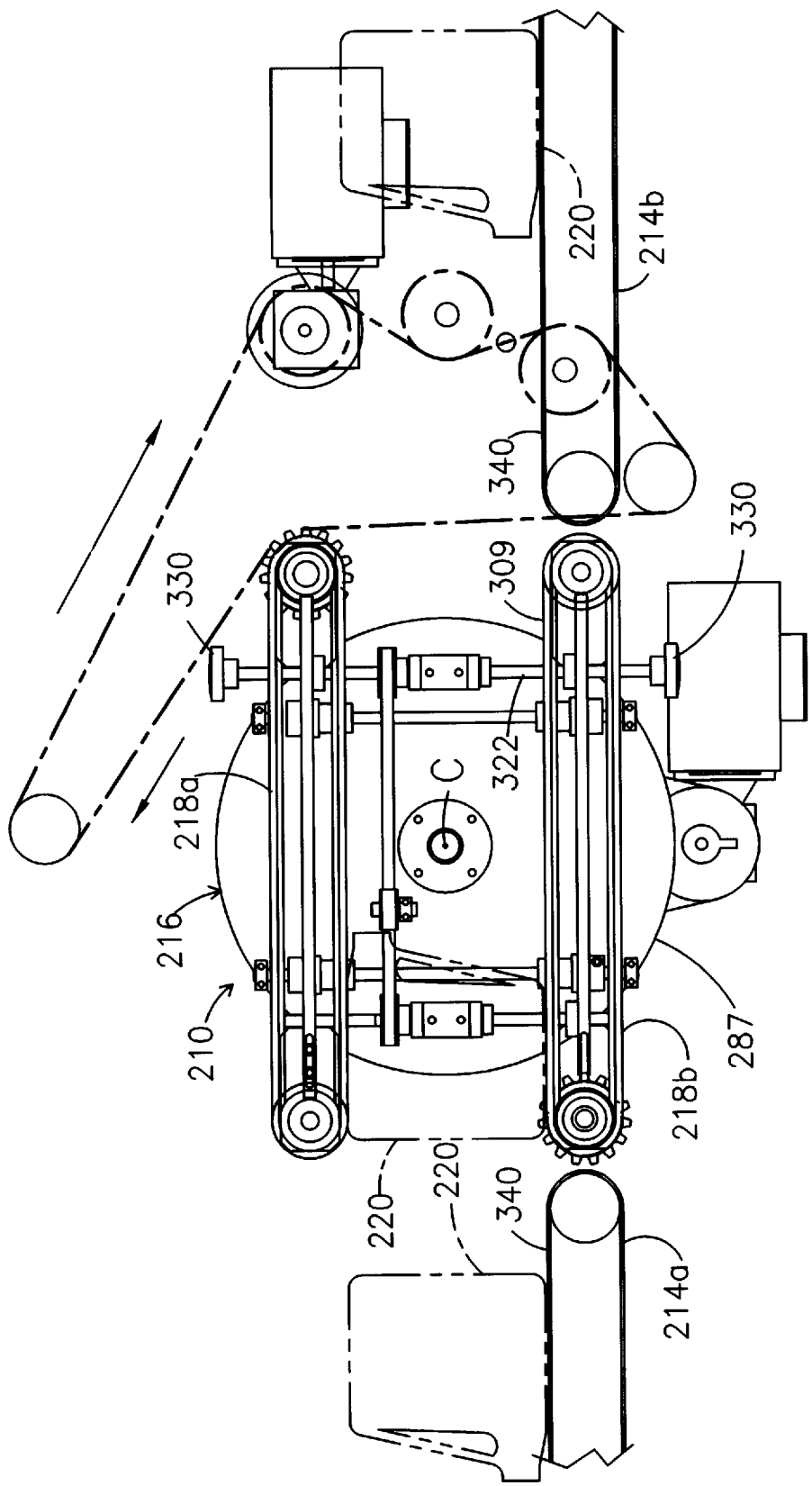
FIG. 9 is a front elevational view of a second embodiment of the invention of FIG. 1.

A second embodiment of the apparatus 10 is disclosed in FIG. 9. As seen in FIG. 9, this embodiment simply comprises a horizontal orientation of the apparatus 210 so that the drive belts 218a and 218b lie in a generally vertical plane in relation to one another and the support member axis C is generally parallel to the conveyor surfaces 340. In addition, the surfaces 340 of the two conveyors 214a and 214b lie in the same horizontal plane as the interior portion 309 of one of the drive belts, conveniently drive belt 218b as shown in FIG. 9. Of course, upon rotation of the support member 216 drive belt 218a will be in alignment with the conveyors 214a and 214b. In this embodiment the base 287 is shown as being circular and the adjustment rod 322 is offset; however, the remaining structure and means of operation remain the same.

Many of the materials from which the apparatus 10 is constructed has been previously discussed. The remaining parts are constructed from materials obvious to those skilled in the art. Most parts are constructed from steel, but may be constructed from other materials suitable for the purpose.

Having thus set forth two preferred embodiments for the orientating apparatus 10 and 210, attention is now invited to a description of the use of the orientating apparatus 10. As the use of embodiment 10 and embodiment 210 are very similar we will address our description toward the operation of embodiment 10 of this invention. The apparatus 10 is usually incorporated within a production line that includes many additional operating steps that may result in a filled, capped, and packaged article 20 that is ready for shipment. When an article 20a approaches the apparatus 10 it has already been through some alignment steps so that, as shown in FIG. 2, the articles 20a through 20d (conveniently containers with handles and openings on the top) are shown with the handle 138 either leading as shown by article 20a or trailing as shown by articles 20c.

The operation of device 10 is controlled by a programmable controller 39, which may be an Alan Bradley 500 series controller. The controller 39 controls the actions of the various operating elements of the apparatus 10 to ensure that the articles 20 are tracked and rotated as necessary. Indexing sensors (not shown) that are well known in the art, are electronically connected to the controller 39, to track the location of the articles 20. In addition, a sensor 136 is located proximal to the conveyor 14 to sense the particular orientation of the article 20 prior to its approach to the apparatus 10. Sensor 136 in a preferred embodiment is a photo-electric sensor; however, other sensors well known in the art may be used as a substitute for the photo-electric sensor, particularly if more effective with a particular article shape. For example, a proximity sensor, or a mechanical arm with magnetic electric switch, or a T.V. camera\vision system, or a ultrasonic sensor or a laser may be used.

In the example shown in FIG. 2 the articles comprise containers 20 that are to be filled, therefore their spout must be indexed in the same position in order to be properly aligned with filling equipment (not shown) that is located downstream. In this example, it is determined that the handle 138 should lead and all articles should be orientated with the handle 138 leading. As can be seen in FIG. 2 article 20b and article 20c are placed with the handle trailing and must be rotated so that the handle leads.

With the production line in operation, the conveyor 14 is moving downstream in the direction A, the second drive motor 98 is in continuous operation driving the chain drive 96. The first drive motor 24 is also in continuous operation and the solenoid valve 64 is in the low pressure position so that low pressure air (15 to 25 psi) is passed to the pneumatic clutch 32. With low pressure air, the clutch 32 applies just sufficient torque to the drive shaft 26 so that the support member 16 is pushed against the extended bumpers 40a and 40b of the two way pneumatic cylinders 35a and 35b respectively, as shown in schematic FIG. 8.

Figure 5:
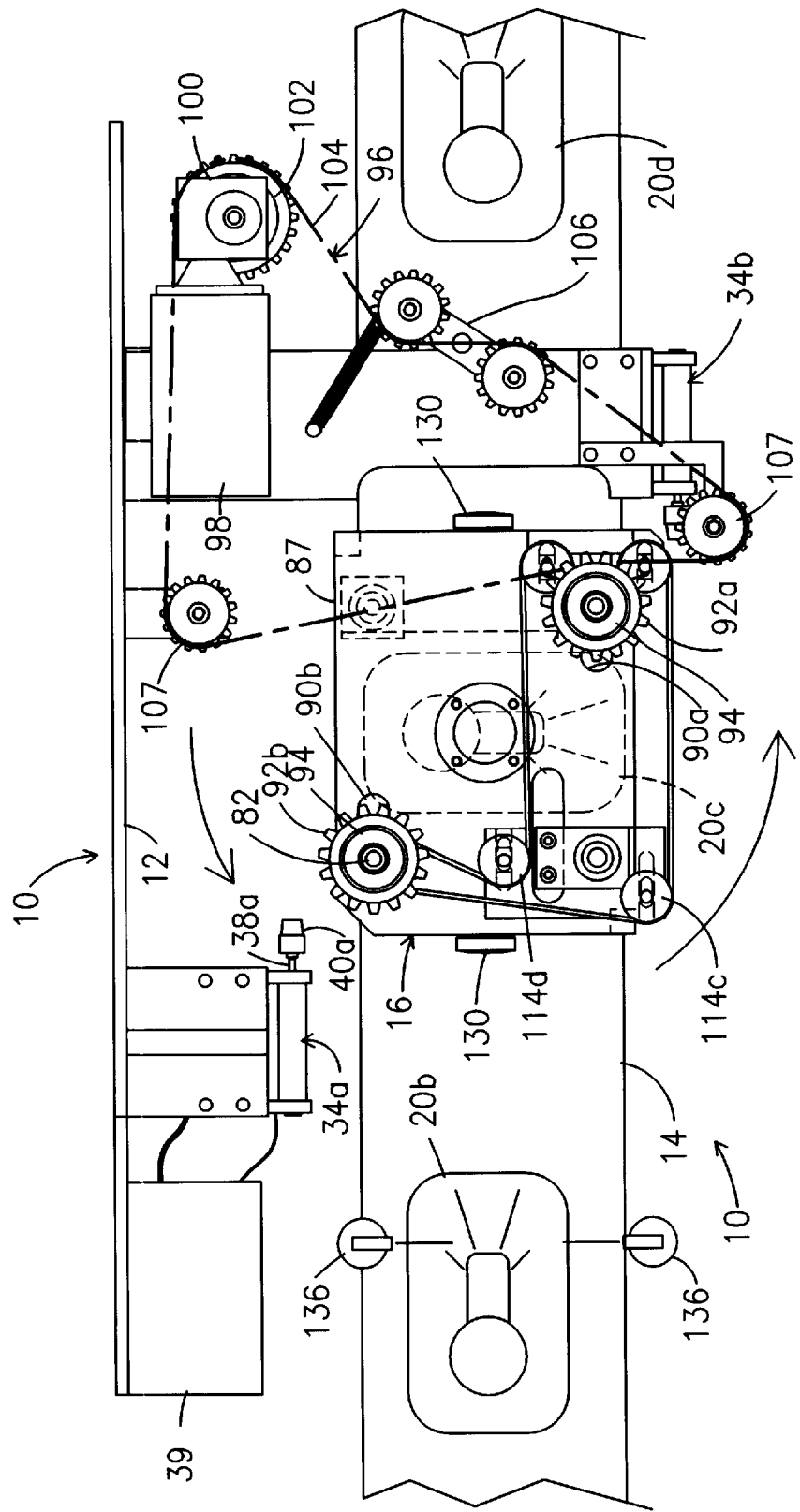
FIG. 5 is the plan view of FIG. 4 illustrating the rotation of the support member through 90 degrees.
Figure 6:
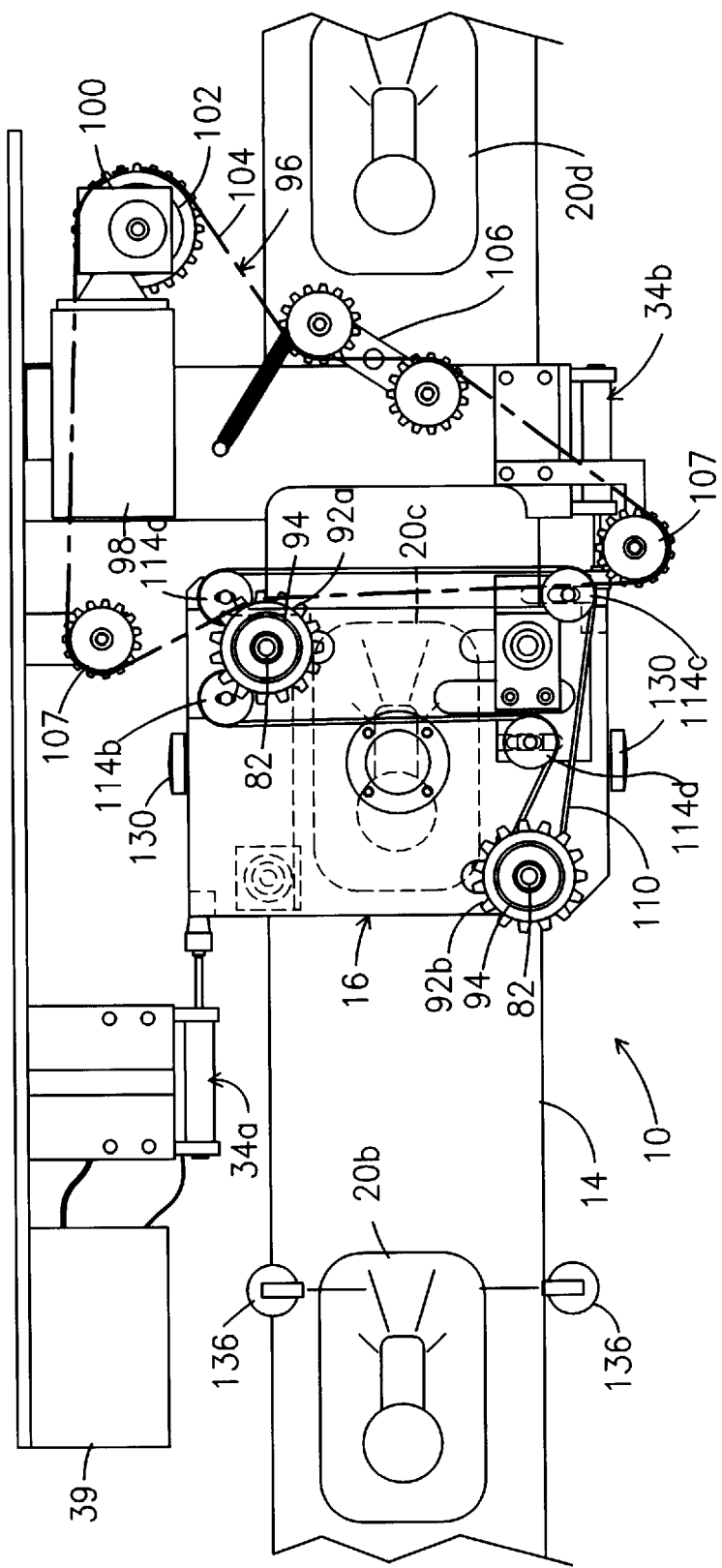
FIG. 6 is a plan view of FIG. 3 illustrating the rotation of the support member through 180 degrees.

In FIG. 4, the sensor 136 has previously communicated to the programmable controller 39 that article 20c is improperly aligned. The controller 39, by standard indexing procedures, notes when the container 20c has entered between the drive belts 18a and 18b and activates the first solenoid valve 48 so that air pressure is applied to air line 50 and released from airline 52 so that the piston and shaft 38a and 38b of the two-way pneumatic cylinders 35a and 35b, respectively, are driven inwardly releasing the support member 16 for rotation. As there is a low level of torque being applied to the drive shaft 26 by the clutch 34 the support member 16 will commence rotation. As the shaft 26 rotates, the flag 68 will rotate away from the proximity sensor 66, as shown in schematic FIG. 8. The proximity sensor 66 signals the programmable controller 39 to switch the second solenoid valve 64 to the high pressure position so that air at a pressure of approximately 60 psi is passed to the pneumatic clutch 32 which engages the drive shaft 26 for high speed rotation of the support member 16. As the support member 16 begins rotation the chain drive sprocket 92b disengages from the chain 104 of the chain drive 96 and ceases rotation. When rotation has reached approximately 90 degrees, as shown in FIG. 5, the chain drive sprocket 92a engages the chain 104. As the support member 16 is rotating faster than the chain 104 is moving in the clockwise direction the chain drive sprocket 92a would in effect be rotating in the clockwise direction opposite to the intended rotation of counterclockwise. The roller clutch 32 allows the chain drive sprocket 92a to idle and engage for clockwise rotation once the the chain drive sprocket 92a commences counterclockwise rotation.

At approximately the 90 degree position shown in FIG. 5, the flag 68 will pass before the proximity sensor 66 sending a signal to the programmable controller 39, which switches the second solenoid valve 64 to the low pressure air line 60. Under the low pressure the clutch 32 reduces that torque being applied to the drive shaft 26, so that in effect the support member 16 coasts the remaining 90 degrees of rotation to complete the 180 degrees of rotation. At the same time the programmable controller 39 switches the first solenoid valve 48 so that air pressure is applied to air line 52 and air pressure is released from air line 50, causing the pistons and shaft 38a and 38b to extend. When the support member 16 completes the 180 degree rotation the bumpers 40a and 40b engage the support member 16 bringing it to a stop so that the drive belts 18a and 18b are parallel to the predetermined path. The low level torque applied to the drive shaft 26 is sufficient to hold the support member 16 firmly against the stop devices 34a and 34b. The direction of rotation of the drive belts 18a and 18b has now been reversed so that the container 20c is moved down the predetermined path along the conveyor 14 in the downstream direction A.

The apparatus 10 is now ready to receive article 20b, which the sensor 136 determines does not require rotation as the handle 138 already leads. Article 20b will be passed through the apparatus 10 without rotation.

When a different width article is to be processed, the knob 130 will be rotated so that the drive belts 18a and 18b are moved toward one another or away from one another to snugly receive the new sized container therebetween. No other adjustment is required if it is only the width of the container that has changed. If other dimensions have changed it will be necessary to change the positioning of the sensors (indexing and positioning) and the timing of the movement of the operation of apparatus 10.

In the second embodiment disclosed in FIG. 9, the apparatus operates in the same manner rotating the support member 216 so that all the containers are bottom leading and top trailing. To adjust the distance between the drive belts 218a and 219b all that is necessary is to rotate one of the knobs 330.

While the foregoing has described several particularly preferred embodiments of the apparatus of this invention, numerous other variations and modifications, all within the scope of the invention, will readily occur to those skilled in the art. Accordingly, the descriptions are to be considered only as illustrative of the principles of the invention and not to be limitative thereof. The scope of this invention is to be defined solely by the claim appended thereto.

What is claimed is:

1. An apparatus for orientating articles being advanced along a predetermined path comprising:

a support frame;

at least one conveyor positioned adjacent said support frame for advancing an article along a predetermined path, defining an upstream direction and a downstream direction along said path;

a selectively rotatable support member connected to said frame and disposed adjacent said predetermined path;

means for rotating said support member being connected thereto for rotation of said support member between two positions;

a sensor for detecting orientation of an article when said article is being conveyed along said predetermined path, said sensor being connected to said frame adjacent said predetermined path proximal said support member and said sensor being operatively connected to said means for rotating said support member for selective rotation thereof;

two pair of rotary drive members comprising a first pair and a second pair of rotary drive members connected to said support member, a pair of continuous loop drive belts comprising a first and a second continuous loop drive belt, said first drive belt being mounted on said first pair of rotary drive members and said second drive belt being mounted on said second pair of rotary drive members, said drive belts extending longitudinally between and around said rotary drive members, said drive belts extending generally parallel to said conveyor and being spaced apart from one another for engagement of an article therebetween; and means for driving at least one of said rotary drive members being attached to said frame and connected to said first pair of rotary drive members for movement of said first drive belt mounted thereon, and upon rotation of said support member, said drive means is disengaged from said first pair of rotary drive members and is operatively engaged with said second pair of rotary drive members for movement of said second belt mounted thereon, such that as said support member rotates said first and second pair of rotary drive members alternately engage said drive means for rotation.

2. An apparatus for orientating articles being advanced along a predetermined path as in claim 1 wherein said support member has an axis of rotation generally normal to said conveyor, and said means for rotating said support member comprises:

a drive shaft attached to said support frame and connected to said support member;

a drive motor operatively attached to said drive shaft for application of a rotational force to said drive shaft for rotation of said drive shaft about the axis of rotation of said support member;

a clutch attached to said drive shaft for selectively modifying said rotational force between a first torque force and a second torque force;

at least one stop device attached to said frame for engaging said support member when said pair of drive belts are longitudinally aligned with said predetermined path and disengaging from said support member when said member is to rotate; and a control operatively connected to said clutch and to said stop device, for selecting between the application of said first torque force and said second torque force by said clutch and for activating for engagement and for disengagement of said stop device with said support member, whereby said stop device is disengaged from said support member and said first torque force is applied by said clutch to said drive shaft when said control is signaled by said sensor that rotation of an article is required, and said second torque force is applied by said clutch to said drive shaft and said stop device is activated for engagement with said support member when said rotation of an article is partially complete.

3. An apparatus for orientating articles being advanced along a predetermined path as in claim 1 further comprising:

four spindles, each having a first end and a second end, one pair of rotary drive members of said two pair of rotary drive members being attached to said second end of each spindle, said rotary drive members of said first and second spindles of said four spindles operatively engaging one of said pair of drive belts for rotation of said drive belts, and said rotary drive members of the third and fourth spindles of said four spindles operatively engaging the other one of said pair of drive belts, said four spindles being connected to said support member, and said means for driving at least one of said pair of drive belts being operatively engageable with said first spindle for rotation thereof and upon rotation of said support member said drive means is disengaged from said first spindle and is operatively engaged with said fourth spindle, whereby as said support member rotates said first and fourth spindles alternately engage said drive means for rotation.

4. An apparatus for orientating articles being advanced along a predetermined path as in claim 3 further comprising;

a timing belt comprising a continuous loop and having a first side and a second side, said timing belt connecting said first spindle with said fourth spindle for simultaneous rotation, said first side of said timing belt engaging said first spindle and said second side of said timing belt engaging said fourth spindle, whereby when said first spindle is connected to said means for driving at least one of said pair of drive belts said fourth spindle is connected to said means for driving at least one of said pair of drive belts by said timing belt and rotates in the opposite direction from the direction of rotation of said first spindle and the portion of each drive belt of said pair of drive belts adjacent said article moves in the same direction.

5. An apparatus for orientating articles being advanced along a predetermined path as in claim 4 further comprising;

said spindles being adjustably attached to said support member such that the attached drive belts are selectively movable toward one another and away from one another while the inward portions of each said drive belt remains parallel with one another and with said predetermined path, a first and a second idler being fixed to said support member on opposing sides of said first spindle such that said second side of said timing belt engages said idlers and said first side of said timing belt engages said first spindle, a third and a fourth idler, being adjustably attached to said support member in conjunction with said third and fourth spindles such that said idlers move outwardly and inwardly with said third and fourth spindles, said third and fourth idlers directing said timing belt such that the second side of the timing belt engages said fourth spindle, whereby the spacing between the pair of drive belts may be adjusted to engage various sized articles without changing the length of said timing belt.

6. An apparatus for orientating articles being advanced along a predetermined path as in claim 1, wherein said support member has an axis of rotation generally horizontal to said at least one conveyor.

7. An apparatus for orientating articles being advanced along a predetermined path as in claim 6, wherein two said conveyors are positioned adjacent said support frame for advancing an article along a predetermined path, said support member being disposed adjacent said predetermined path, and one of said pair of continuous loop drive belts being inserted between and adjacent to said conveyors such that said interior portion of said drive belt lies generally in the same plane as the surface of the conveyor belts.

* * * * *